March 10, 1936.  A. J. RIVETT-CARNAC  2,033,816
ARC WELDING
Filed July 22, 1935    2 Sheets-Sheet 1
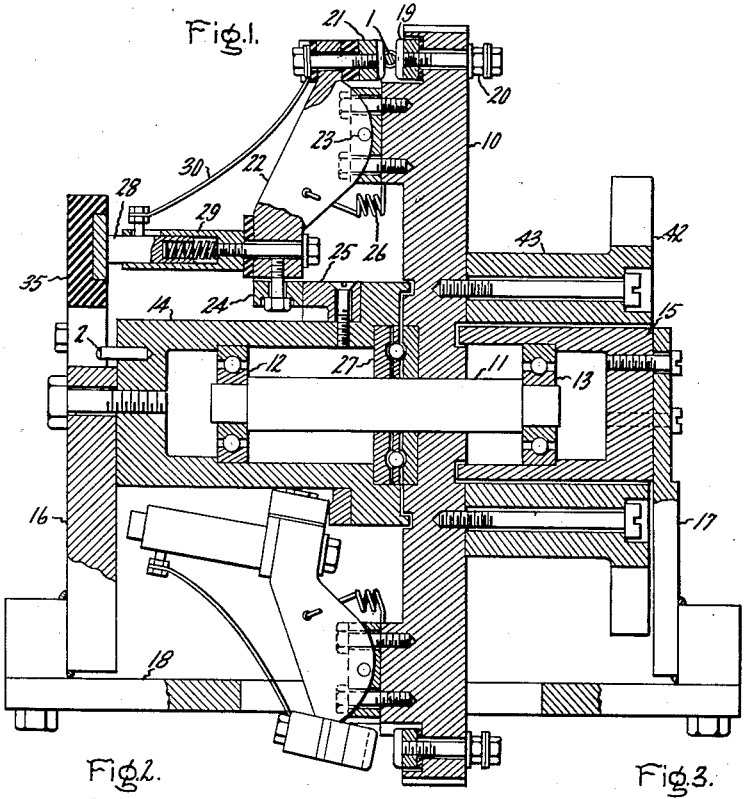
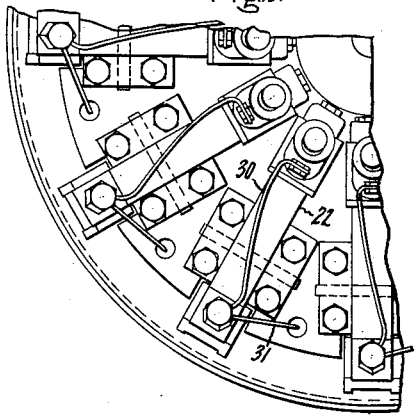
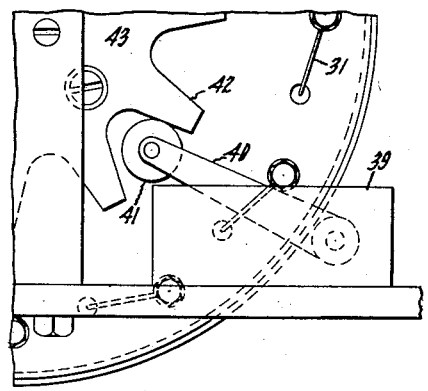
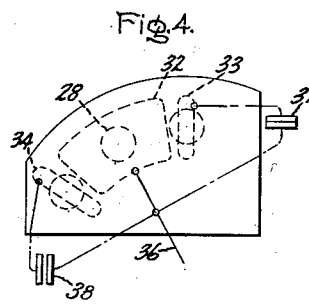
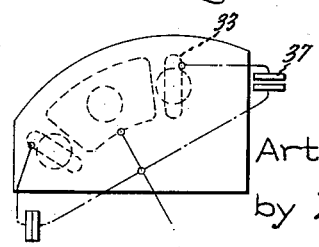
Inventor:
Arthur J. Rivett-Carnac,
by Harry E. Dunham
His Attorney.

March 10, 1936.  A. J. RIVETT-CARNAC  2,033,816
ARC WELDING
Filed July 22, 1935  2 Sheets-Sheet 2
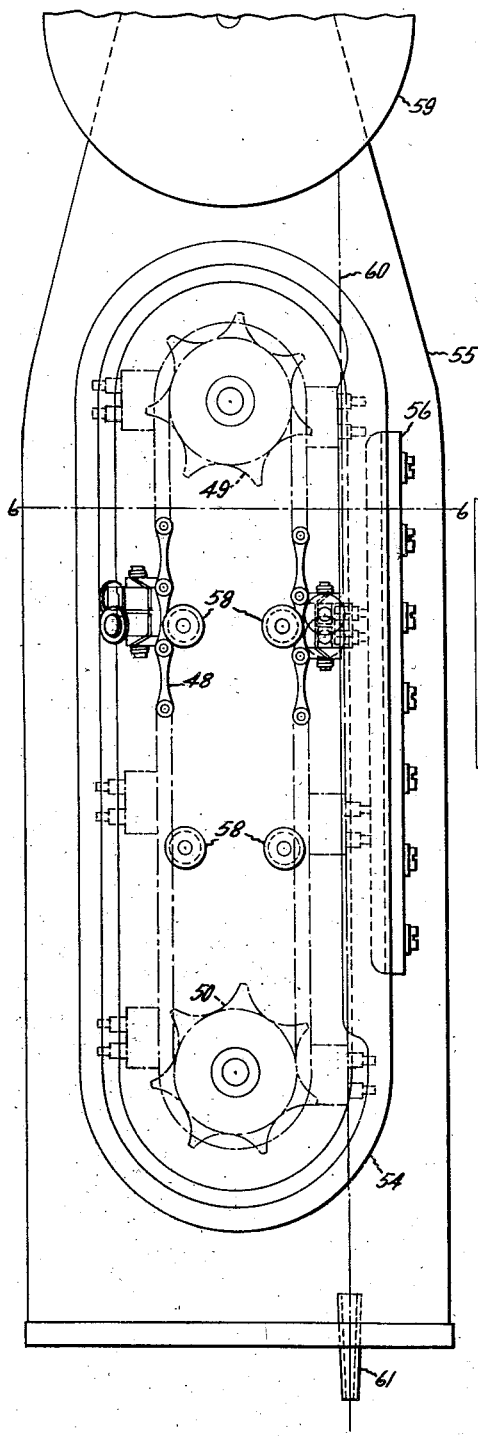
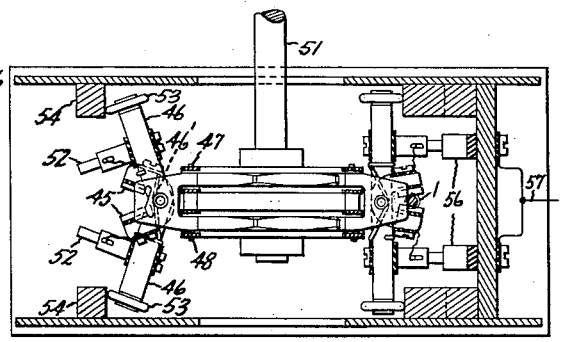
Inventor:
Arthur J. Rivett-Carnac,
by Harry E. Dunham
His Attorney.

Patented Mar. 10, 1936

2,033,816

UNITED STATES PATENT OFFICE 2,033,816

ARC WELDING

Arthur J. Rivett-Carnac, Grahamstown, South Africa, assignor to General Electric Company, a corporation of New York Application July 22, 1935, Serial No. 32,596
In Great Britain August 1, 1934

10 Claims. (Cl. 219—8)

My invention relates to arc welding and especially, though not exclusively, to means for feeding electrodes having insulating coatings thereon. The flux coatings on electrodes are generally made of insulating materials and in automatic and semi-automatic welding machines it is necessary to supply the welding current to the electrodes through these coatings.

It is an object of my invention to provide a feeding means in which electrical connection is made with traveling jaws which pierce or cut the covering on an electrode only after said jaws have been forced into conductive engagement with the electrode and in which the electrical connections to said jaws is interrupted before said jaws are separated from the electrode. This arrangement prevents destructive sparking at the jaws and preserves the cutting surfaces of the jaws.

Further objects of my invention will become apparent from a consideration of the following description of two embodiments thereof.

In the drawings, Fig. 1 is a side sectional view of an arrangement embodying my invention in which the electrode is led in a tangential direction to a feed wheel and after passing between a suitable number of the gripping jaws mounted thereon is delivered in a tangential direction to the usual feeding nozzle of the welding device; Fig. 2 is a partial side view illustrating the radial arrangement of the jaw supporting levers on the feed wheel; Fig. 3 is a partial side view illustrating the construction of a switching means and its operating mechanism by means of which the flow of welding current to the jaws mounted on the feed wheel is controlled, and Figs. 4 and 5 are diagrammatic views illustrating the connections of the switching means with contact segments forming part of the mechanism illustrated in Figs. 1, 2, and 3. Fig. 6 is a side view and Fig. 7 a sectional view along the lines 6—6 of Fig. 6 illustrating the construction of a device embodying my invention in which the electrode passes through the feeding means in a straight line instead of the arc of a circle. The arrangement of jaws, their operating mechanism, and the switching means are essentially the same as illustrated in Figs. 1, 2, and 3.

In the arrangement illustrated in Figs. 1, 2, and 3, an electrode 1 is fed in a tangential direction to a feed wheel 10 and after passing along the arc of a circle is delivered in a tangential direction to the usual feeding nozzle of the welding device. The feed wheel is supported on a shaft 11, the ends of which are mounted in bearings 12 and 13. These bearings are located in brackets comprising cup-shaped members 14 and 15 and supports 16 and 17 to which the cups are attached. The supports 16 and 17 are located on a base plate 18, the central portion of which has been removed to form a passageway for the feed wheel 10 and the parts supported thereon.

Circumferentially spaced on the feed wheel 10 are a plurality of jaws 19 which are secured in place thereon by bolts 20. Jaws 21 placed opposite to and cooperating with jaws 19 are supported on the outer ends of levers 22 which are circumferentially spaced about the feed wheel 10 and pivotally attached thereto as indicated at 23. Rolls 24 journalled on the inner ends of the levers 22 constitute cam followers for a cam 25 attached to the cup-shaped member 14. These cam followers are biased into engagement with the cam 25 by springs 26, the ends of which are attached to the levers 22 and to the feed wheel 10. A pin 2 is provided for locating cam 25 and member 14 relatively to the support 16.

The feed wheel 10 may be a spur gear, as illustrated, which is rotated to feed the electrode in accordance with its consumption during welding. The rotating of the feed wheel relatively to the cam 25 produces a sequential operation of the levers 22 by means of which the cutting surfaces of the cooperating jaws 19 and 21 are caused to pierce the coating on the electrode and make a conductive engagement therewith. A bearing 27 is provided between the feed wheel 10 and the cup member 14 on which the cam 25 is located in order to resist the thrust resulting from the action of the cam on the ends of the levers 22 through the cam followers 24.

Welding current is supplied to pairs of cooperating jaws 19 and 21 through contact 28 spring supported in carriers 29 attached to the inner ends of the levers 22. These contacts are electrically connected with the jaws 19 and 21 by means of conductors 30 and 31. The jaws may be made of copper and have cutting surfaces of hardened steel. These contacts, jaws and conductors 31 are suitably insulated from the levers and feed wheel on which they are located as illustrated in the drawings.

Current is supplied to contacts 28 through a main contact segment 32 and leading and trailing contact segments 33 and 34 across which each contact 28 is moved when the jaws 19 and 21 have been forced into conductive engagement with the electrode. These segments are located on an insulating support 35 attached to the upper end of the support 16. The leading and trailing contact segments 33 and 34 are separated from the main contact segment less than the width of a contact 28, as shown in Figs. 4 and 5. The main contact segment 32 is connected to a source of welding current through a conductor 36 and the leading and trailing contact segments 33 and 34 are connected through switches 37 and 38 to the main contact segment 32. The switches 37 and 38 form part of the switching means 39 illustrated in Fig. 3. These switches are operated by a lever 40 terminating in a roller 41 which engages the spokes 42 of a star-wheel 43 attached to the feed wheel 10. The arrangement is such that contact 28 engages the leading segment 33 after the cooperating jaws 19 and 21 connected thereto have made a conductive engagement with the electrode and disengages the trailing contact segment 34 before these jaws move out of conductive engagement with the electrode. The switches 37 and 38 have been provided for preventing destructive sparking between the contacts 28 and segments 33 and 34. According to the arrangement contacts 37 are closed as shown in Fig. 4 after a contact 28 has moved into engagement with segment 33 and switch 38 is opened before a contact 28 moves from segment 34. As has been pointed out above, the cam mechanism forming part of the feeding device causes the jaws 19 and 21 conductively to engage the electrode before the contact 28 connected thereto engages the leading segment 33 and to remain in engagement with the electrode until after its connected contact 28 has passed from the trailing segment 34. In Fig. 4 the cam is about to release pressure on the jaw members connected to a contact 28 on the trailing segment 34 and the switch 38 is shown in an open position having disconnected its trailing segment 34 from the source of supply before a contact 28 moves therefrom. In Fig. 5 the cooperating jaws connected to a contact 28 in engagement with the leading contact segment 33 are gripping the wire and the switch 37 has not yet closed to complete the connection with the source of supply to these jaws.

In the embodiment illustrated in Figs. 6 and 7 the arrangement of parts is such that the electrode passes through the feeding means in a straight line instead of the arc of a circle as in the embodiment illustrated in Figs. 1, 2, and 3.

In Figs. 6 and 7 the clamping jaws 45 having cutting surfaces to pierce the electrode coating are supported on pairs of levers 46, mounted on and spaced along an endless flexible member comprising chains 47 and 48. These chains are propelled by pairs of sprockets 49 and 50 on which they are supported. One pair of sprockets is driven through a shaft 51 which is connected to a suitable motor mechanism. The pairs of levers 46 are provided with spring biased contacts 52 which are insulated from the levers 46 and electrically connected to the jaws 45 which are insulated from and supported on these levers. The levers 46 are also provided with cam followers 53 which engage cams 54 supported in a frame 55 within which the levers are located. The cam followers 53 are biased into engagement with the cams 54 by springs 46' acting on the levers 46. These cams form a track for the cam followers 53 and operate the levers to bring the jaws 45 into conductive engagement with the electrode and to bring the contacts 52 into conductive engagement with electrical conductors 56 supported on and insulated from the frame 55 and electrically connected to a source of supply through conductor 57. The configuration of the cams 54 is such that pairs of cam followers 53 moving thereover cause cooperating jaws 45 associated therewith to engage the electrode through a predetermined portion of its travel and the location and length of the electrical conductors 56 are such that the contacts 52 on said pairs of levers engage therewith only after the jaws 45 have been moved into conductive engagement with the electrode and disengage from these conductors before the jaws 45 associated therewith have moved out of conductive engagement with the electrode. The arrangement is clearly illustrated in Fig. 6. This figure also illustrates one means for preventing the chains 47 and 48 from sagging due to the force exerted thereon by the cam mechanism and the spring-pressed contacts 52. This means comprises a plurality of rollers 58 suitably supported in the frame 55.

In Fig. 6 a reel 59 for the welding electrode has been illustrated as supported on the frame 55 and the path of travel of the electrode has been indicated by a dot and dash line 60. It will be noted that the electrode is fed through a nozzle 61 supported in the frame 55.

Feeding means embodying my invention may be used in automatic and semi-automatic arc welding machines to feed an electrode in accordance with its consumption in the arc. The rate of feeding may be made dependent on a characteristic of the welding circuit such as arc current and voltage. Any suitable arrangement for accomplishing this purpose may be employed.

Various modifications of the arrangement illustrated and described above will occur to those skilled in the art. It is, of course, apparent that it is not necessary to use cooperating jaw members since, by the use of a suitable backing member for the electrode, individual jaw members may be employed. It is also apparent that the arrangement of parts may be variously modified without departing from my invention in accordance with which electrical connection is made with traveling jaws, having cutting surfaces adapted to pierce the insulating coating of electrodes, only after the jaw members have been forced into conductive engagement with the electrode and is interrupted before these jaw members are moved out of conductive engagement with the electrode. By employing such an arrangement, rapid destruction of the cutting surfaces of the jaws by means of which the electrode is propelled and through which current is supplied to the electrode is effectively prevented and the feeding mechanism thus enabled to perform its functions in a more certain and satisfactory manner.

What I claim as new and desire to secure by Letters Patent of the United States is:

1. Means for feeding an electrode having an insulating coating thereon comprising an electrically conductive means for piercing said coating and making contact with said electrode, means for propelling said piercing and contact making means, means for moving said piercing and contact making means into and out of electrically conductive engagement with said electrode, and means for supplying welding current to said piercing and contact making means after it has been forced into conductive engagement with said electrode and for interrupting the supply of welding current thereto before it is moved out of conductive engagement with said electrode.

2. Means for feeding an electrode having an insulating coating thereon comprising a plurality of jaws provided with means for piercing the coating on said electrode and for supplying welding current thereto, means for moving said jaws in a closed path part of which corresponds with the path of movement of said electrode through said feeding means, and means for moving each of said jaws into and out of engagement with said electrode at predetermined points in its path of travel and for connecting it to a source of welding current after it has been forced into engagement with said electrode and for disconnecting it from said source of welding current before it has been moved out of engagement with said electrode.

3. Means for feeding an electrode having an insulated coating thereon comprising a plurality of jaws provided with means for piercing the coating on said electrode and for supplying welding current thereto, means for moving said jaws in a closed path part of which corresponds with the path of movement of said electrode through said feeding means, means for moving each of said jaws into and out of engagement with said electrode at predetermined points in its path of travel, and means for supplying welding current to said jaw after it has been forced into engagement with said electrode and for interrupting the supply of welding current thereto before it is moved out of engagement with said electrode.

4. Electrode feeding means comprising a plurality of pivoted levers each of which is provided with a cam follower, an electrode clamping jaw for supplying welding current thereto, and a contact electrically connected to said jaw, means for moving said levers in a closed path through part of which the path of travel of said jaws corresponds with the path of movement of said electrode through said feeding means, a cam over which said cam followers move, and means including an electrical conductor in the path of travel of said contacts for supplying welding current thereto, the configuration of said cam being such that a cam follower moving thereover causes the clamping jaw mounted on the same lever therewith to engage said electrode throughout a predetermined portion of its path of travel corresponding with the path of travel of said electrode and the location and length of said electrical conductor being such that the contact on said lever engages therewith after said jaw has been moved into engagement with said electrode and disengages therefrom before said jaw has moved out of engagement with said electrode.

5. Means for feeding an electrode having an insulating coating thereon comprising a plurality of pivoted levers each of which is provided with a cam follower, an electrode clamping jaw having means for piercing the coating on said electrode and for supplying welding current thereto, and a contact electrically connected to said jaw, means for moving said levers in a closed path through part of which the path of travel of said jaws corresponds with the path of movement of said electrode through said feeding means, a cam over which said cam followers move, means for biasing said cam followers into engagement with said cam, and means including an electrical conductor in the path of travel of said contacts for supplying welding current thereto, the configuration of said cam being such that a cam follower moving thereover causes the clamping jaw mounted on the same lever therewith to engage said electrode throughout a predetermined portion of its path of travel corresponding with the path of travel of said electrode and the location and length of said electrical conductor being such that the contact on said lever engages therewith after said jaw has been moved into engagement with said electrode and disengages therefrom before said jaw has moved out of engagement with said electrode.

6. Electrode feeding means comprising a feed wheel, levers pivotally attached to said wheel and circumferentially spaced thereabout, a jaw mounted on each of said levers, a cam follower mounted on each of said levers, a cam over which said cam followers move, means for rotating said feed wheel relatively to said cam, a contact mounted on each of said levers and electrically connected to the jaw supported on said lever, and means including an electrical conductor in the path of travel of said contacts for supplying welding current thereto, the configuration of said cam being such that a cam follower moving thereover causes the clamping jaw mounted on the same lever therewith to engage said electrode throughout a predetermined portion of its path of travel corresponding with the path of travel of said electrode and the location and length of said electrical conductor being such that the contact on said lever engages therewith after said jaw has been moved into engagement with said electrode and disengages therefrom before said jaw has moved out of engagement with said electrode.

7. Electrode feeding means comprising a feed wheel, levers pivotally attached to said wheel and circumferentially spaced thereabout, a jaw mounted on each of said levers, a cam follower mounted on each of said levers, a cam over which said cam followers move, means for rotating said feed wheel relatively to said cam, a contact mounted on each of said levers and electrically connected to the jaw supported on said lever, a main contact segment in the path of travel of said contacts, contact segments leading and trailing said main contact segment in the path of travel of said contacts, said leading and trailing segments being spaced from said main segment less than the width of said contacts, means for electrically connecting said contact segments with one another and to a source of welding current, and means for electrically insulating said jaws, contacts and segments from the remaining structure of said feeding means, the configuration of said cam being such that a cam follower moved thereover causes the clamping jaw mounted on the same lever therewith to move into gripping engagement with said electrode throughout a predetermined portion of its path of travel and the location of said segments being such that the contact on said lever engages the leading segment after said clamping jaw has engaged said electrode and disengages the trailing segment before said jaw has moved out of engagement with said electrode.

8. Means for feeding an electrode having an insulating coating thereon comprising a feed wheel, jaws circumferentially spaced about said wheel, levers pivotally attached to said wheel and circumferentially spaced thereabout, a jaw mounted on each of said levers and cooperating with a jaw on said wheel for piercing the coating on said electrode and for supplying welding current thereto when said jaws are forced into engagement therewith, a cam follower mounted on each of said levers, a cam over which said cam followers move, means for rotating said feed wheel relatively to said cam, a contact mounted on each of said levers and electrically connected to the jaw supported on said lever and its cooperating jaw supported on said wheel, a main contact segment in the path of travel of said contacts, contact segments leading and trailing said main contact segment in the path of travel of said contacts, said leading and trailing segments being spaced from said main segment less than the width of said contacts, means for electrically connecting said contact segments with one another and to the source of welding current, and means for electrically insulating said jaws, contacts and segments from the remaining structure of said feeding means, the configuration of said cam being such that a cam follower moved thereover causes the clamping jaw mounted on the same lever therewith and its cooperating jaw to move toward one another into gripping and conductive engagement with said electrode throughout a predetermined portion of its path of travel and the location of said segments being such that the contact on said lever engages the leading segment after said cooperating jaws have conductively engaged said electrode and disengages the trailing segment before said jaws have moved out of conductive engagement with said electrode.

9. Means for feeding an electrode having an insulating coating thereon comprising a feed wheel, jaws circumferentially spaced about said wheel, levers pivotally attached to said wheel and circumferentially spaced thereabout, a jaw mounted on each of said levers and cooperating with a jaw on said wheel for piercing the coating on said electrode and for supplying welding current thereto when said jaws are forced into engagement with said electrode, a cam follower mounted on each of said levers, a cam cooperating with said cam follower and having a configuration such that a cam follower moved thereover causes the clamping jaw mounted on the same lever therewith and its cooperating jaw to move toward one another into gripping and conductive engagement with said electrode throughout a predetermined portion of its path of travel, means for rotating said feed wheel relatively to said cam, a contact mounted on each of said levers and electrically connected to the jaw supported on said lever and its cooperating jaw supported on said wheel, a main contact segment in the path of travel of said contacts, contact segments leading and trailing said main contact segment in the path of travel of said contacts, said leading and trailing segments being spaced from said main segment less than the width of said contacts, means for connecting said main segment to a source of welding current, means for electrically insulating said jaws, contacts and segments from the remaining structure of said feeding means, switching means for controlling the connection of said leading and trailing segments with said main segment, and means rotatable with said feed wheel for operating said switching means and for completing the connection of said leading segment with said main segment after a contact has made engagement therewith and the cooperating jaws connected with said contact have conductively engaged said electrode and for interrupting the connection of said trailing segment with said main segment before said contact has moved from said trailing segment and the cooperating jaws connected with said contact have conductively disengaged said electrode.

10. Electrode feeding means comprising an endless flexible member, means for propelling said member, levers mounted in pairs and spaced along said member, cooperating jaws attached to said pairs of levers, cam followers attached to said pairs of levers, cams over which said pairs of cam followers move, contacts electrically connected to said cooperating jaws, and means including an electrical conductor in the path of travel of said contacts for supplying welding current thereto, the configuration of said cams being such that pairs of cam followers moving thereover cause the cooperating clamping jaws associated therewith to engage said electrode throughout a predetermined portion of their path of travel corresponding with the path of travel of said electrode, and the location and length of said electrical conductor being such that the contacts on said pairs of levers engage therewith after said cooperating jaws have been moved into engagement with said electrode and disengage therefrom before said cooperating jaws have moved out of engagement with said electrode.

ARTHUR J. RIVETT-CARNAC.